No. 805,463. PATENTED NOV. 28, 1905.
W. F. HERRICK.
APPARATUS FOR PROMOTING COMBUSTION.
APPLICATION FILED JUNE 25, 1904.
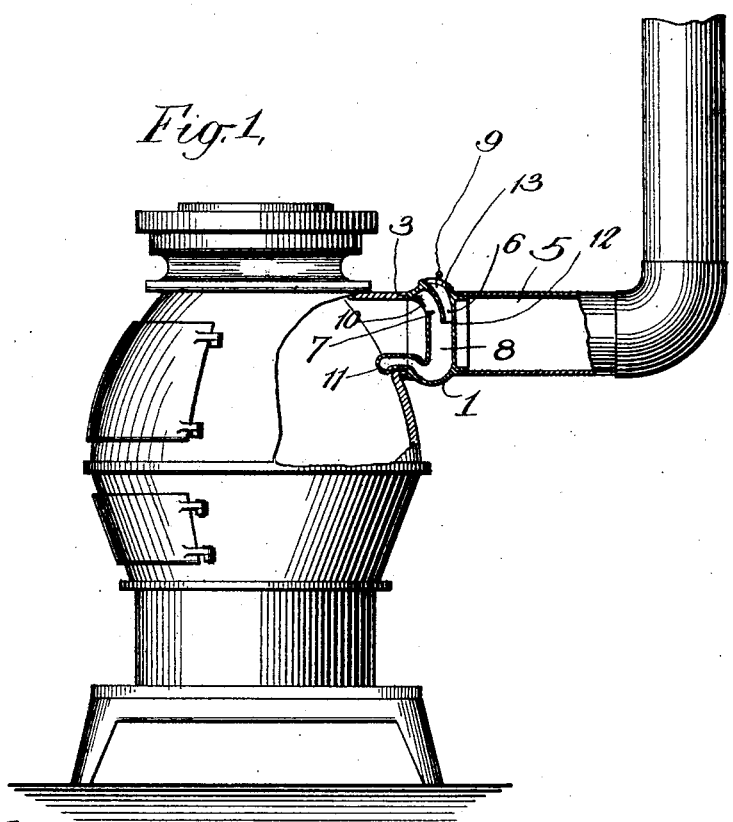
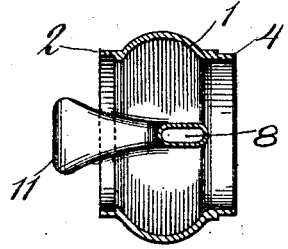
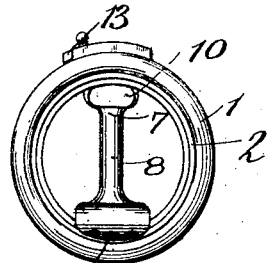
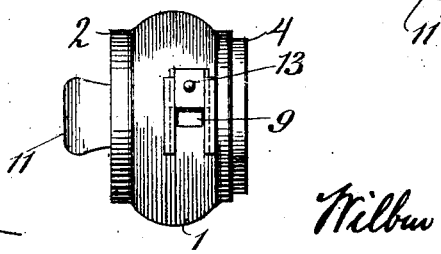
WITNESSES:
Harold Crocheron
Albert W. Gibbs.
INVENTOR
Wilbur F. Herrick
BY
Chapin Hayward Mault
his ATTORNEYS

UNITED STATES PATENT OFFICE.

WILBUR F. HERRICK, OF HAWORTH, NEW JERSEY, ASSIGNOR TO HERRICK COMPLETE COMBUSTION COMPANY, OF NEW YORK, N. Y., A CORPORATION OF MAINE.

APPARATUS FOR PROMOTING COMBUSTION.

No. 805,463.     Specification of Letters Patent.     Patented Nov. 28, 1905.

Application filed June 25, 1904. Serial No. 214,098.

*To all whom it may concern:*

Be it known that I, WILBUR F. HERRICK, a citizen of the United States of America, and a resident of Haworth, county of Bergen, State of New Jersey, have invented certain new and useful Improvements in Apparatus for Promoting Combustion, of which the following is a specification, reference being had to the accompanying drawings, forming a part thereof.

My invention relates to improvements in apparatus for promoting combustion, and particularly to means for introducing atmospheric air into the combustion-chamber of a furnace, stove, or the like and mixing the same with the hot products of combustion. It is well understood, of course, that with the ash-pit and furnace doors closed there is a tendency to a vacuum in the combustion-chamber. This tendency to vacuum is utilized for the purpose of drawing in air to promote combustion. In order that air thus drawn in may be utilized to the best advantage, it is necessary to raise its temperature to a high degree. One reason for this is that carbon monoxid or the products of imperfect combustion require that the air shall be at a high degree of temperature before the oxygen thereof is available for combination therewith to produce carbon dioxid. In the formation of carbon dioxid more than three times the number of heat units are liberated than in the formation of carbon monoxid, and hence the conversion of all the carbon monoxid to carbon dioxid is desirable.

In carrying out my invention I provide a form of injector through which the currents of air induced by the lowering of pressure in the combustion-chamber must pass, and I utilize the inductive force of the current of air to carry back a certain portion of the products of combustion passing from the furnace, so that the temperature of the air will be raised by intimate contact with the hot products of combustion, and the imperfectly consumed products of combustion and air will be mixed together and returned to the combustion-chamber, where they will be consumed and oxygen supplied to consume the carbon monoxid evolved from the furnace.

The present embodiment of my invention comprises a collar carrying an injector of the above description and arranged to be attached to a stove, range, furnace, heater, or the like between the same and the smoke-pipe.

I will now proceed to describe such a device embodying my invention and will then point out the novel features in claims.

In the drawings, Figure 1 is a view in side elevation of a stove having a draft-collar embodying my invention employed in connection therewith, a portion of the stove being broken away and the draft-collar being shown in central vertical longitudinal section. Fig. 2 is a view in central horizontal section through the draft-collar on a scale larger than that employed for Fig. 1. Fig. 3 is an end view of same. Fig. 4 is a top view thereof.

The present device comprises a draft-collar consisting of a tubular shell 1, arranged at one end 2 to fit the nipple 3 with which stoves, ranges, furnaces, heaters, and the like are usually provided and at the other end 4 arranged to receive the end of the smoke-pipe 5. The tubular shell forms a support for the injector, which includes an air-passage 6, a passage for products of combustion 7, and a mixing and heating chamber 8. The air-passage 6 receives atmospheric air through the inlet-opening 9, which opens directly to atmosphere, while the passage 7 receives products of combustion through the flared mouth 10, which opens directly into the combustion-chamber. The mixed gases are delivered into the combustion-chamber through perforations 11.

It will be noticed that the injector extends transversely across the draft-collar; but by examination of Figs. 2 and 3 it will be seen that in cross-section the device is quite narrow, so as to but little oppose the passage of gases to the smoke-pipe, while still exposed to the heat thereof.

In operation the fire-door will be kept closed and the ash-pit door will also be closed, or opened but a little way, thereby creating a tendency to vacuum in the combustion-chamber, as is well understood. This tendency to vacuum will create a draft, drawing air in a continuous stream through the passage 6 into the injector. The inductive force at the nozzle 12 will draw in products of combustion through the passage 7, the said products of combustion and air thus mixing in the mixing-chamber 8, whereby the temperature of the air will be raised to a degree sufficient to make the oxygen thereof available. The products of combustion and heated air thus mixed will be discharged through the perforations 11 into the combustion-chamber above the fuel, supplying the same with sufficient hot air to promote combustion therein, converting the carbon monoxid into carbon dioxid and obtaining the greatest efficiency from the burning fuel.

A draft-collar of this description may constitute an article of manufacture which may be readily applied to existing stoves, ranges, furnaces, heaters, or the like with a minimum of trouble and expense. The device itself is extremely simple and easy to manufacture and may be applied by merely interposing it between the end of the smoke-pipe and the nipple or ring to which the smoke-pipe end is ordinarily attached, as clearly illustrated in the drawings.

The passage of air through the device may be controlled by any suitable means, as by the use of a sliding gate 13, which may be employed for closing or partially closing the inlet 9.

What I claim is—

1. In an apparatus for promoting combustion, the combination with a combustion-chamber, of a draft-collar through which the products of combustion may pass, said draft-collar containing a mixing and heating chamber, and means for admitting air and a portion of the products of combustion thereto, and for delivering the mixed gases into the combustion-chamber above the fuel.

2. In an apparatus for promoting combustion, the combination with a combustion-chamber, of a draft-collar through which the products of combustion may pass, said draft-collar supporting an injector provided with an air-inlet, an inlet for products of combustion and a mixing and heating chamber, the device including a nozzle for assisting the induction of the products of combustion by the air-currents flowing therethrough, and a passage for discharging the mixed gases into the said combustion-chamber above the fuel.

3. In an apparatus for promoting combustion, the combination with the combustion-chamber of a heater, stove or the like, of a draft-collar located in open communication with the said combustion-chamber and between same and the smoke-pipe, said draft-collar supporting an injector comprising an air-inlet, an inlet for products of combustion, a mixing and heating chamber and a discharge for the mixed gases arranged to discharge same into said combustion-chamber above the fuel.

4. In an apparatus for promoting combustion, the combination with a stove, heater or the like, of a draft-collar arranged to be connected at the outlet of the combustion-chamber, and through which the products of combustion from the combustion-chamber may pass, said draft-collar containing an injector having an air-inlet, an inlet for products of combustion, a mixing and heating chamber and a passage leading therefrom to a point in proximity to the combustion-chamber, and having an outlet arranged to deliver mixed gases directly into the said combustion-chamber above the fuel.

5. In an apparatus for promoting combustion, the combination with a combustion-chamber, of a draft-collar through which the products of combustion may pass, said draft-collar containing a mixing and heating chamber, and means for admitting air and a portion of the products of combustion thereto, and for delivering the mixed gases into the combustion-chamber above the fuel, and means for regulating and controlling the passage of air to the mixing-chamber.

6. As an article of manufacture, a draft-collar arranged to be connected with the combustion-chamber of a stove, heater or the like, and through which the products of combustion from the combustion-chamber will pass, said draft-collar supporting an injector comprising an air-inlet, an inlet for products of combustion, a mixing and heating chamber, and a discharge for the mixed gases arranged to deliver same into the said combustion-chamber above the fuel.

7. As an article of manufacture, a draft-collar arranged to be connected with the combustion-chamber of a stove, heater, or the like, and through which the products of combustion from the combustion-chamber will pass, said draft-collar supporting an injector comprising an air-inlet, an inlet for products of combustion, a mixing and heating chamber, and a discharge for the mixed gases arranged to deliver same into the said combustion-chamber above the fuel, said injector having means for regulating and controlling the passage of air therethrough.

8. As an article of manufacture, a draft-collar arranged to be connected with the combustion-chamber of a stove, heater, or the like, and through which the products of combustion from the combustion-chamber will pass, said draft-collar supporting an injector arranged diametrically across the same, said injector having an air-inlet opening to the atmosphere, an inlet for the products of combustion, provided with an outwardly-flared mouth opening into the interior of the draft-collar, and facing toward the combustion-chamber, a mixing-chamber, and a discharge leading the mixed gases back toward the combustion-chamber and arranged to discharge same into the said combustion-chamber.

WILBUR F. HERRICK.

Witnesses:
 D. HOWARD HAYWOOD,
 C. L. HALL.